United States Patent
Kodaypak

(10) Patent No.: US 9,680,924 B2
(45) Date of Patent: Jun. 13, 2017

(54) SYSTEM AND METHOD FOR RESOURCE SELECTION DURING GROUP COMMUNICATION BROADCAST

(71) Applicant: AT&T INTELLECTUAL PROPERTY I, LP, Atlanta, GA (US)

(72) Inventor: Rajendra Prasad Kodaypak, Sammamish, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 80 days.

(21) Appl. No.: 14/851,904

(22) Filed: Sep. 11, 2015

(65) Prior Publication Data

US 2017/0078371 A1    Mar. 16, 2017

(51) Int. Cl.
 H04L 29/08    (2006.01)
 H04W 4/02    (2009.01)
 H04L 29/06    (2006.01)

(52) U.S. Cl.
 CPC ........ H04L 67/101 (2013.01); H04L 65/4076 (2013.01); H04L 67/1034 (2013.01); H04W 4/021 (2013.01)

(58) Field of Classification Search
 CPC ............... H04L 67/101; H04L 65/4076; H04L 67/1034; H04W 4/021
 See application file for complete search history.

(56) References Cited

U.S. PATENT DOCUMENTS

| | | | |
|---|---|---|---|
| 6,996,410 B2 | 2/2006 | Bos et al. | |
| 7,162,241 B2 | 1/2007 | Kim et al. | |
| 7,457,288 B2 | 11/2008 | Park et al. | |
| 7,957,376 B2 | 6/2011 | Eriksson et al. | |
| 7,969,979 B2 | 6/2011 | Fuchs et al. | |
| 8,576,763 B2 | 11/2013 | Gonsa et al. | |

(Continued)

FOREIGN PATENT DOCUMENTS

| | | |
|---|---|---|
| CN | 101098267 B | 7/2011 |
| EP | 1522203 A1 | 4/2005 |

(Continued)

OTHER PUBLICATIONS

Afzal, Janaid et al., "Video Streaming Over MBMS: A System Design Approach", Journal of Multimedia 1.5, 2006, 25-35.

(Continued)

*Primary Examiner* — Jae Y Lee
(74) *Attorney, Agent, or Firm* — Guntin & Gust, PLC; Jay H. Anderson

(57) ABSTRACT

Aspects of the subject disclosure may include, for example, receiving a request to initiate a multimedia broadcast multicast service (MBMS) to wirelessly distribute media content to mobile user equipment within a target geographical region using a common radio channel An efficiency metric is obtained, in response to the request, for each broadcast multicast service center (BMSC). The efficiency metric is evaluated for each of the BMSCs and one of the BMSCs is selected based on the evaluation result. Establishment of an MBMS bearer service is facilitated using the selected BMSC, and a first media content item is disseminated to the mobile user equipment within the target geographical region using the common radio channel by way of the MBMS bearer service. Other embodiments are disclosed.

20 Claims, 7 Drawing Sheets

(56) References Cited

U.S. PATENT DOCUMENTS

| | | |
|---|---|---|
| 8,594,684 B2 | 11/2013 | Miller et al. |
| 8,811,302 B2 | 8/2014 | Santhanam et al. |
| 8,867,425 B2 | 10/2014 | Korus et al. |
| 9,042,291 B2 | 5/2015 | Korus |
| 2005/0007971 A1 | 1/2005 | Jeong et al. |
| 2007/0055634 A1 | 3/2007 | Albertao et al. |
| 2010/0306408 A1 | 12/2010 | Greenberg et al. |
| 2011/0305183 A1 | 12/2011 | Hsu et al. |
| 2012/0170502 A1 | 7/2012 | Korus et al. |
| 2012/0314630 A1 | 12/2012 | Walker et al. |
| 2013/0194999 A1* | 8/2013 | Anchan ............... H04W 76/002 370/312 |
| 2013/0294318 A1 | 11/2013 | Amerga et al. |
| 2014/0064177 A1* | 3/2014 | Anchan ................. H04W 4/08 370/312 |
| 2014/0286224 A1 | 9/2014 | Yu et al. |
| 2014/0355508 A1 | 12/2014 | Anchan et al. |
| 2015/0163643 A1* | 6/2015 | Slssingar ............ H04L 65/4076 370/312 |
| 2015/0172890 A1 | 6/2015 | Zu |
| 2016/0006805 A1* | 1/2016 | Ulupinar ................ H04L 67/02 709/217 |
| 2016/0301724 A1* | 10/2016 | Kodaypak ........... H04L 43/0817 |

FOREIGN PATENT DOCUMENTS

| | | |
|---|---|---|
| WO | 2014046686 A1 | 3/2014 |
| WO | 2015038438 A1 | 3/2015 |
| WO | 2015068983 A1 | 5/2015 |

OTHER PUBLICATIONS

Baker, N. et al., "Enabling Multimedia Broadcast/Multicast Services Over Converged Networks", WWRF 17 Meeting, Nov. 2006, 4-5.

Carla, Lorenzo et al., "LTE Enhancements for Public Safety and Security Communications to Support Group Multimedia Communications", 2015, pp. 5-6.

Pinho, Luis Andre Silva Cruz , "Next Generation Multimedia Multicast Services", 2011.

Xylomenos, George , "The Multimedia Broadcast/Multicast Service", Wireless Communications and Mobile Computing, 2008, 255-265.

\* cited by examiner

100

200

300

US 9,680,924 B2

1

SYSTEM AND METHOD FOR RESOURCE SELECTION DURING GROUP COMMUNICATION BROADCAST

FIELD OF THE DISCLOSURE

The subject disclosure relates to a system and method for resource selection during group communication broadcast.

BRIEF DESCRIPTION OF THE DRAWINGS

Reference will now be made to the accompanying drawings, which are not necessarily drawn to scale, and wherein.

DETAILED DESCRIPTION

Figure 1:
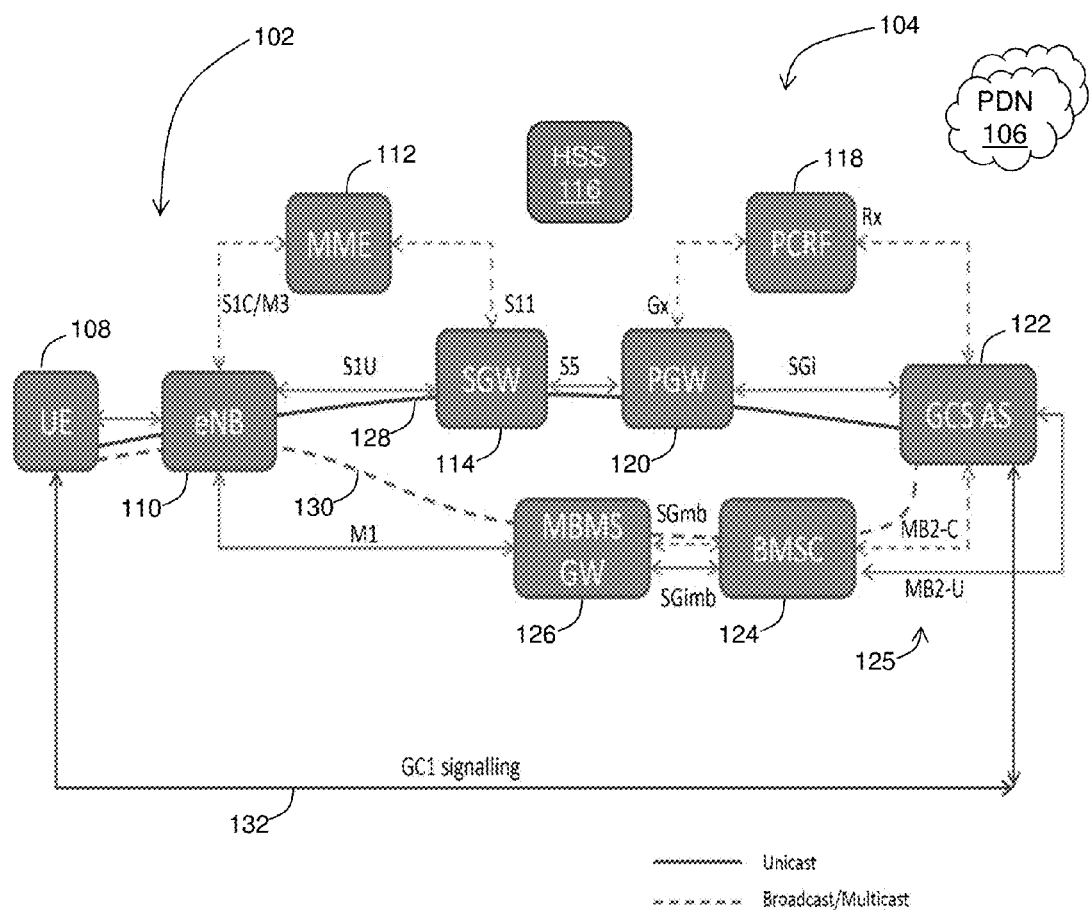
FIG. 1 depicts an illustrative embodiment of a group communication service network.

The subject disclosure describes, among other things, a nodal selection process between equipment of a group communication service provider and core network elements of a mobile operator network that includes redundant, e.g., pooled, resources. The group communication services include point-to-multipoint distribution of information from a group communication service source to one or more mobile communication terminals. A process for selecting a network element or node can be directed to implementing group communication services, by facilitating end-to-end communication paths that establish control signaling and bearers, on demand, in a timely and cost-effective manner. Other embodiments are described in the subject disclosure.

One or more aspects of the subject disclosure include a system including a processor and a memory that stores executable instructions. The executable instructions, when executed by the processor, facilitate performance of operations that include receiving a request to initiate a multimedia broadcast multicast service (MBMS) to wirelessly distribute media content to mobile user equipment within a target geographical region using a common radio channel. An efficiency metric is obtained, in response to the request, for each broadcast multicast service center (BMSC) of a number of BMSCs available to process the media content for distribution to the mobile user equipment within the target geographical region. The number of BMSCs includes geographically diverse groups of redundant BMSCs. The efficiency metric is evaluated for each of the BMSCs to obtain an evaluation result, wherein the efficiency metric is based on measured parameters related to the BMSCs. One of the BMSCs is selected based on the evaluation result, and establishment of an MBMS bearer service is facilitated using the selected BMSC. A first media content item is disseminated to the mobile user equipment within the target geographical region using the common radio channel by way of the MBMS bearer service.

One or more aspects of the subject disclosure include a process that determines a request to initiate a MBMS service to wirelessly distribute media content to mobile user equipment within a target geographical region using a common radio channel An efficiency parameter is determined in response to the determining that the request has been made for each BMSC of a number of BMSCs available to process the media content for distribution to the mobile user equipment within the target geographical region. The BMSCs include geographically diverse groups of redundant BMSCs. The efficiency parameter is evaluated for each of the BMSCs to obtain an evaluation result, wherein the efficiency parameter is based on measured parameters related to the BMSCs. A BMSC is selected based on the evaluation result, and establishment of an MBMS bearer service is facilitated using the selected BMSC, wherein a first media content item is disseminated to the mobile user equipment within the target geographical region using the common radio channel by way of the MBMS bearer service.

One or more aspects of the subject disclosure include a machine-readable storage medium, having executable instructions that, when executed by a processor, facilitate performance of operations that include receiving a notification of a request to initiate a MBMS service to wirelessly distribute media content to mobile user equipment within a target geographical region using a common radio channel. In response to the notification, an operational parameter is determined for each BMSC)of a number of BMSCs available to process the media content for distribution to the mobile user equipment within the target geographical region. The BMSCs include geographically diverse groups of redundant BMSCs. The operational parameter is evaluated for each of the plurality of BMSCs to obtain an evaluation result, wherein the operational parameter is based on measured parameters related to the BMSCs. A BMSC is identified based on the evaluation result, and establishment of an MBMS bearer service is facilitated using the selected BMSC, wherein a first media content item is disseminated to the mobile user equipment within the target geographical region using the common radio channel by way of the MBMS bearer service.

Generally speaking, group communications can be broadcast over high-speed mobile data networks, such as Internet Protocol (IP) networks utilizing radio technologies, such as Long Term Evolution (LTE) and LTE-Advanced radio technologies to provide superior service quality. Examples of group communications broadcast include, without limitation, mission critical applications such as emergency, public safety and, more generally, any critical communication. Other group communication services can include entertainment applications, such as broadcast audio and/or video services. Examples can include broadcast of a live event, such as a political debate, a sporting event or reporting of news events.

Other group communication services can include scheduled broadcasts according to a program schedule, such as a program lineup according to an electronic program guide. Sources of group communication services can include, without limitation, public service entities, such as government agencies, weather bureaus, educational intuitions, e.g., offering live and/or pre-recorded educational material or courses, traditional broadcast networks, network service providers, such as cable and/or satellite service providers, on-demand providers, e.g., providing group communication services in relation to a pay-per-view event, content producers, such as networks, cable networks, motion picture studios, and the like.

It is understood that the application of group communication services can include personal broadcasting, in which an individual and/or service provider provides source content for distribution to a number of mobile terminals. Source content can include personal media, playlists, personal television (TV) channels, personally obtained media such as audio and/or video that may be obtained from pre-recorded media files, live streaming, or a combination of both pre-recorded and streaming media. Group communication services can include social media, such as FACEBOOK®, YOUTUBE®, and the like. It is understood further that group communication services can include dissemination of advertisement content according to any of the systems, devices and or processes disclosed herein.

Presently, group communication services, such as broadcast-multicast services, over mobile IP networks technology is in an early stage of standards development. Accordingly, there are many opportunities for improvement in the delivery of such services across multiple network elements in an LTE network path, and in particular to support delivery of services, including commercial, carrier-grade services.

An illustrative embodiment of a network architecture 100 related to the current disclosure is depicted in FIG. 1. In particular, the network architecture 100 disclosed herein is referred to as a Group Communications Service (GCS) network architecture 100, providing a one-to-many communications capability that supports a sharing of resources, including a sharing of radio resources, such as available radio spectrum. In more detail, the example group communications system architecture 100 can be based at least in part on standards developed by the 3rd Generation Partnership Project (3GPP) initiative, with information available at www.3gpp.org. By way of non-limiting example, some 3GPP standards that address group communications system architecture using LTE broadcast (LTE-B) include: 3GPP TS 23.468, entitled "Group Communication System Enablers for LTE (GCSE_LTE)"; 3GPP TS 25.324, entitled "Broadcast/Multicast Control BMC"; 3GPP TS 23.041, entitled "Technical Realization of Cell Broadcast Service (CBS)" and 3GPP TS 22.246, entitled "MBMS User Services," all incorporated herein by reference in their entireties.

In one embodiment, the group communications system architecture 100 includes an access network portion 102 and a core network portion 104, e.g., an Enhanced Packet Core (EPC) or common back bone that can communicate with one or more external networks 106, sometimes referred to as Packet Data Networks (PDN) 106 or peer entities. The access network 102, without limitation, can include an LTE network architecture sometimes referred to as Evolved Universal mobile Telecommunication system Terrestrial Radio Access (E UTRA) and evolved UMTS Terrestrial Radio Access Network (E-UTRAN). Broadly, the access network 102 can include one or more wireless mobile terminals or communication devices, commonly referred to as user equipment (UE) 108, and one or more wireless access nodes, or base stations 110. During network operations, at least one base station 110 communicates directly with the UE 108.

The base station 110 can be an evolved Node B (e-NodeB) in EUTRAN, with which the UE 108 communicates over the air and wirelessly. The UEs 108 can include, without limitation, wireless devices, e.g., satellite communication systems, portable digital assistants (PDAs), laptop computers, tablet devices and other mobile devices (e.g., cellular telephones, smart appliances, and so on). Such UEs 108 can connect to the eNBs 110 when the UE 108 is within range according to a corresponding wireless communication technology.

The UE 108 generally runs one or more applications that engage in a transfer of packets between the UE 108 and one or more of the external networks 106. Such packet transfers can include one of downlink packet transfers from the external network 106 to the UE 108, uplink packet transfers from the UE 108 to the external network 106 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within the core network 104, e.g., according to parameters, such as the QoS.

The core network 104 uses a concept of bearers, e.g., enhanced packet service (EPS) bearers, to route packets, e.g., IP traffic, between a particular gateway in the core network 104 and the UE 108. A bearer refers generally to an IP packet flow with a defined QoS between the particular gateway and the UE 108. The access network 102, e.g., E UTRAN, and the core network 104 together set up and release bearers as required by the various applications.

In one embodiment, the core network 104 includes various network entities, such as a Mobility Management Entity (MME) 112, a Serving Gateway (SGW) 114, a Home Subscriber Server (HSS) 116, a Policy and Charging Rules Function (PCRF) 118 and a PDN gateway (PGW) 120. In one embodiment, the MME 112 comprises a control node performing a control signaling between various equipment and devices in the access network 102 and the core network 104.

In at least some embodiments, the group communication network architecture 100 also includes one or more of a Multimedia Broadcast-Multicast Service gateway (MBMS-GW) 126 and a Broadcast Multicast Service Center (BMSC) 124. The BMSC, among other features, can support MBMS broadcast mode functionality and an interface/reference point functionality, e.g., an MB2 reference point towards GCS-AS for activating, deactivation and modifying an MBMS bearer associated with a group service. The BMSC 124 traditionally provides functions for the MBMS-GW 126 that relate to user service provisioning and delivery. For example, the BMSC 124 issues a session start request, provided on an interface, such as an SGmb diameter based interface. The MBMS-GW 126 traditionally provides an interface for entities using MBMS bearers through the SGimb (user plane) reference point and an interface for entities using MBMS bearers through the SGmb (control plane) reference point. The MBMS-GW 126 also traditionally facilitates IP multicast and/or broadcast distribution of MBMS user plane data to E-UTRAN nodes (e.g., M1 reference points).

For illustration purposes only, the MME 112, SGW 114, HSS 116, PGW 120, BMSC 124 and MBMS-GW 126 network elements or nodes, and so on, can be server devices, but may be referred to in the subject disclosure without the word "server." It is also understood that any form of such servers can operate in a device, system, component, or other form of centralized or distributed hardware and software, including virtual machines, e.g., in relation to software defined networks. It is further noted that these terms and other terms such as bearer paths and/or interfaces are terms that can include features, methodologies, and/or fields that may be described in whole or in part by standards bodies such as the 3GPP and IETF. It is further noted that some or all embodiments of the subject disclosure may in whole or in part modify, supplement, or otherwise supersede final or proposed standards published and promulgated by 3GPP/IETF.

In operation, the PCRF 118 can perform Quality of Service (QoS) management functions and policy control. The PCRF 118 is responsible for policy control decision-making, as well as for controlling the flow-based charging functionalities in a policy control enforcement function (PCEF) (not shown), which may reside in another node, such as the PGW 120. The PCRF 118 provides the QoS authorization, e.g., QoS class identifier and bit rates that decide how a certain data flow will be treated in the PCEF and ensures that this is in accordance with the user's subscription profile.

The PGW 120 can provide connectivity between the UE 108 and one or more of the external networks 106. In the illustrative network architecture 100, the PGW 120 can be responsible for IP address allocation for the UE 108, as well as one or more of QoS enforcement and flow-based charging, e.g., according to rules from the PCRF 118. The PGW 120 is also typically responsible for filtering downlink user IP packets into the different QoS-based bearers. In at least some embodiments, such filtering can be performed based on traffic flow templates. The PGW 120 can also perform QoS enforcement, e.g., for guaranteed bit rate bearers. The PGW 120 also serves as a mobility anchor for interworking with non-3GPP technologies such as CDMA2000 and WiFi.

With increasing use of high bandwidth applications, especially with a large number of users receiving the same high data-rate services, efficient information distribution is essential. To this end, group communications, such as broadcast and/or multicast techniques are provided to decrease the amount of data within the network 100 and a sharing of limited radio spectrum, resulting in a more efficient use of network resources. In particular, broadcast and multicast are techniques for transmitting data-grams from a single source, such as a Group Communications Service Application Server (GCS-AS) 122 to several destinations, e.g., point-to multipoint. The GCS-AS 122 can support exchanging signaling, e.g., GC1 signaling (including GCS session and group management aspects) with UEs 108, receiving uplink data from UEs 108, delivering data to all UEs 108 belonging to a group, e.g., using unicast and or MBMS delivery, transporting application level session information, and supporting service continuity procedures, e.g., for a UE 108 to switch between unicast/MBMS delivery.

Generally speaking, a multimedia broadcast/multicast service refers to a unidirectional point-to-multipoint service in which data is transmitted from a single source entity to a group of users in a specific area. The broadcast/multicast service has two possible modes: Broadcast mode and Multicast mode. A broadcast session includes a continuous and time-bounded reception of a broadcast service by the UE 108. Likewise, a multicast session is a continuous and time-bounded reception of a multicast service by the UE 108.

A broadcast service can be defined as a unidirectional, point-to-multipoint service in which data is efficiently transmitted from a single source to multiple UEs in an associated broadcast service area. Broadcast services may be received by all users who have enabled the specific broadcast service locally on their UE and who are in the broadcast area defined for the service. Likewise, a multicast service can be defined as a unidirectional point-to-multipoint service in which data is efficiently transmitted from a single source to multiple UEs in an associated multicast service area. Broadcast and/or multicast services may be received by all users who have enabled a specific broadcast/multicast service locally on their UE and who are in an associated broadcast/multicast area defined for the service. It is generally understood that a multicast service is directed to a multicast subscription group. For example, UE access to a multicast service requires a subscription associates the UE with the service.

The broadcast-multicast service area can represent the coverage area of served by a network, such as an entire Public Land Mobile Network (PLMN), or one or more part(s) of such a network. In some applications the broadcast area can be defined individually per broadcast service application, broadcast service subscriber, and the like. For example, an emergency broadcast message can have a broadcast area associated with a content of the message. Consider an emergency broadcast message directed to an area affected by a natural event, such as a hurricane, a flash flood or a forest fire, an Amber Alert, and the like.

For group communications services, the example network architecture 100 includes an interface or reference point, designated as an MB2 interface 125. The MB2 interface can include a signaling or control plane interface, MB2-C and a data or user plane interface MB2-U. As illustrated, the MB2 interface 125 can exist between the BMSC 124 and the GCS-AS 122. It is understood that the particular network elements of the example network architecture 100 are representative. Although the MB2 reference point is disclosed in certain industry standards, it is understood that any reference to MB2 herein can include features of applicable industry standards, with or without additions, deletions and modifications to any applicable standardized features. In at least some embodiments, the MB2 interface 125 or reference point provides an ability for applications to request an allocation and/or deallocation of a set of TMGIs, a request to activate, deactivate and modify an MBMS bearer, and for allowing the BMSC 124 to notify an application of the status of an MBMS bearer. In at least some embodiments, the MB2 reference point 125 can include one or more other features disclosed herein, such as supporting a selection of a particular network element and/or network configuration in relation to an establishment and/or maintenance of any MBMS bearer services.

In some embodiments, elements of the core network 104 are located at a common data center. In such configurations, it is understood that other core networks (not shown) can exist in the same or different data centers, e.g., each serving a respective geographical region. Alternatively or in addition, one or more of the elements of the core network 104 can be provided in a redundant manner, such as in pool of available resources. Such redundancies can be maintained within a common data center and/or across different data centers as in providing geographically diverse redundancies. For geographically diverse network applications, the GCS-AS 122 can access the MB2 interface(s) 125 of one or more BMSCs 124 serving one or more target regions and/or markets.

In establishing a new group communication service, the BMSC 124 can initiate a group communication service session request directed to the MBMS-GW 126. The MBMS-GW 126 responds to the BMSC 124 with session response. The MBMS-GW 126 then sends a session start request to the MME 112, which sends it to the eNB 110, e.g., on an M3 Stream Control Transmission Protocol (SCTP) based interface. In response, the eNB 110 sends a session start response to the MME 112, which sends it to the MBMS-GW 126. Upon successful establishment of the session and radio resource allocation, the eNB 110 can join the transport network IP multicast address to receive the user data from MBMS-GW 126.

An example unicast bearer path 128 is illustrated between the GCS-AS 122 and the UE 108. Other network elements along the unicast bearer path 128, between the GCS-AS and the UE 108, include the PGW 120, the SGW 114, and the eNB 110. It is understood that unicast datagrams can be routed to the UE 108 from the GCS-AS 122. Example unicast service can include, without limitation, on-demand media, such as audio and/or video-on demand.

Likewise, an example broadcast and/or multicast bearer path 130 is illustrated between the GCS-AS 122 and the UE 108. Other network elements along the unicast bearer path 128, between the GCS-AS and the UE 108, include the BMSC 124, the MBMS-GW 126 and the eNB 110. It is understood that, in some instances, broadcast and/or multicast datagrams can be routed to more than one UE 108 attached to the same eNB 110. Alternatively or in addition, broadcast and/or multicast datagrams can be routed to more than one UE 108 attached to different eNBs 110.

Without limitation, reference to various interfaces, such as S1, S5, S11, M1, M3 and MB2 refer to EPS interfaces. In some instances, such interface designations are combined with a suffix, e.g., a "U" or a "C" to signify whether the interface relates to a "User plane" or a "Control plane." In addition, the core network 104 can include various signaling bearer paths/interfaces, e.g., control plane paths/interfaces. The bearer paths and signaling bearer paths are only illustrated as examples and it should be noted that additional bearer paths and signaling bearer paths may exist that are not illustrated.

A GC1 interface 132 or reference point is illustrated between the GCS-AS 122 and the UE 108. In more detail, the GC1 interface 132 can exist between the GCS-AS and an application client on the UE 108 and can be used, for example, in roaming scenarios in which the GCS-AS 122 receives a UE IP address, an HPLMN (home public land mobile network) ID and, in at least some instances, a VPLMN (visiting public land mobile network) ID.

Figure 2:
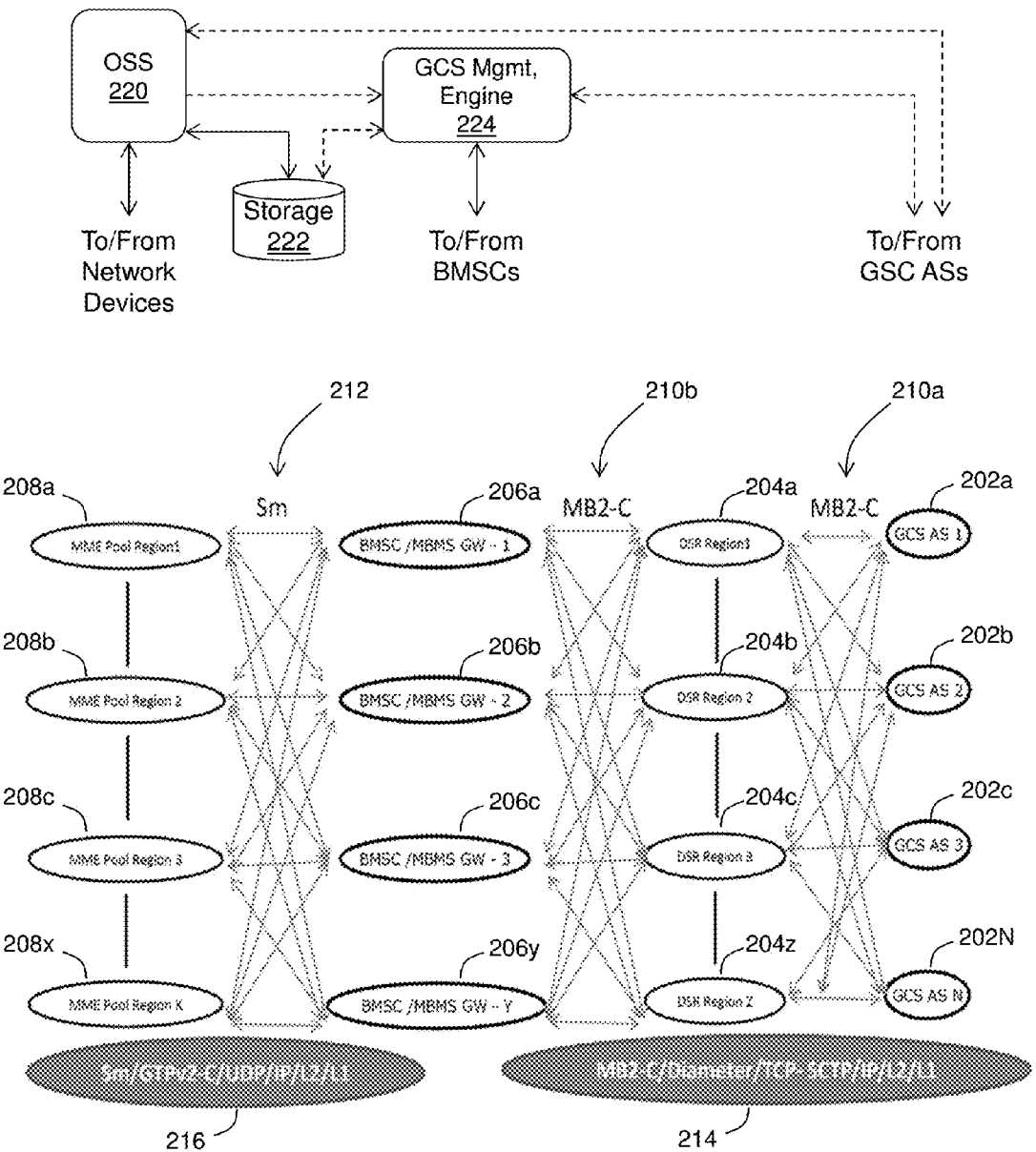
FIG. 2 depicts an illustrative embodiment of another group communication service network.

The GCS-AS 122 and BMSC 124 can be connected either directly or by way of another network element, such as a network traffic controller. One such example of a network traffic controller includes a diameter signaling controller. Diameter signaling is generally understood to have a protocol that handles authentication, authorization and/or accounting messages associated with data network communications. In some embodiments, the diameter signaling controller includes a diameter edge agent and a diameter routing agent. FIG. 2 depicts an illustrative embodiment of another multicast-broadcast mode network 200, in which a first number, N, of GCS-AS 202a, 202b, 202c . . . 202N, generally 202, are in communication with a second number, Z, of BMSC/MBMS-GWs 206a, 206b, 206c . . . 206Z, generally 206, by way of a third number, Y of Diameter Signaling Routers (DSR) 204a, 204b, 204c . . . 204Y, generally 204. The BMSC/MBMS-GWs 206 are in further communication with a fourth number, X, of core network elements, such as MMEs 208a, 208b, 208c . . . 208X, generally 208. Although the BMSC/MBMS-GWs 206 are illustrated by a common symbol, it is understood that the BMSC and the MBMS-GW may, in fact, be separate devices that may be collocated, or separate. As such, interfaces to the GCS-AS 202 would generally terminate with the BMSC functionality, whereas, interfaces to the MMEs 208 would generally terminate with the MBMS-GWs.

The GCS-AS 202 are in communication with the DSR 204 by way of a first MB2 interface 210a. Likewise, the DSR 204 are in communication with the BMSC/MBMS-GW 206 by way of a second MB2 interface 210b. The BMSC/MBMS-GW 206 are in communication with the MMEs 208 by way of an Sm interface. The MB2 interfaces 210a, 210b can include one or more of a first number of protocols 214. In the illustrative example, the first number of protocols 214 includes MB2-C protocol, a diameter protocol, a TCP-SCTP protocol, an IP protocol, as well as protocols associated with the L1 and L2 interfaces or reference points. Likewise, the Sm interfaces 212 can include one or more of a second number of protocols 216. In the illustrative example, the second number of protocols 216 includes a protocol associated with Sm interfaces or reference points, a GPRS Tunneling Protocol GTPv2-C protocol, a UDP protocol, IP protocol and protocols associated with the L1 and L2 interfaces or reference points.

By way of illustrative example, each of the MMEs 208 can itself include a group or pool of MMEs 208. Alternatively or in addition, each of the BMSC/MBMS-GW 206 can be associated with a different data center and/or geographic region. In some embodiments, each BMSC/MBMS-GW 206 can correspond to a respective MME pool region 208, but this need not be a requirement. In a similar fashion, the DSR 204 can be distributed across different data centers and/or geographic regions that may or may not correspond to the locations of the other system components 206, 208. As for the GCS-AS 202, they too can be associated with respective data centers and/or geographic regions. Alternatively or in addition, and without restriction, the GCS-AS 202 can be associated with group communication service providers, including any of the example service providers disclosed herein. In general, any of the pooled resources can be associated with a common data center and/or common geographic region, or distributed across different data centers and/or different geographic regions.

One or more of the aforementioned connectivities 210a, 210b, 212 can be established on a one-to-one basis, e.g., with a particular one of the GCS-AS 202 in communication with a particular one of the DSR 204, a particular one of the DSR 204 in communication with a particular one of the BMSC/MBMS-GW 206, and/or a particular one of the BMSC/MBMS-GW 206 in communication with a particular one of the MMEs 208. Alternatively or in addition, one or more of the aforementioned connectivities 210a, 210b, 212 can include connections from any one of the devices 202, 204, 206, 208 to more than one of the other devices. In at least some embodiments, the devices 202, 204, 206, 208 can be connected in a mesh configuration, such as the full mesh configuration illustrated, in which any one of the devices 202, 204, 206, 208 is connected to all of the other devices according to the aforementioned interfaces.

The MB2 interfaces 210a, 210b disclosed herein can be distinguished from the MB2 interfaces discussed in the aforementioned standards. Namely, the MB2 interfaces 210a, 210b can include features, e.g., improvements at the transport and/or application layers that allow the GCS-AS 202 to select a particular one of the BMSCs 206 for TMGI allocation/de-allocation as well as performing the MBMS bearer activation, deactivation and modification steps. Selection can be based on a predetermined logic and/or according to a set of rules.

In a large operator LTE-B network infrastructure where there may be pooled resources of network elements, e.g., pooled BMSC, MBMS GW, MME, eNBs and/or RANs (Radio Access Networks), the nodal selection process between the GCS-AS 206 and core network elements 206 for a given group communication service can be adapted according to a selection criteria. For example, the selection criteria can include efficiency and/or cost to preferentially establish MBMS service in an efficient and cost-effective manner across the end-to-end communication path. Such efficient and cost effective nodal selections support an establishment of related signaling and bearers, on demand, and in a timely manner. Alternatively or in addition, the selection criteria can include reliability and/or a preference for particular equipment, such as a preferred vendor equipment and/or a preferred software configuration.

By way of example, an intelligent process for dynamic selection of the BMSC core network element 206 by the GCS-AS 202 over the MB2-C interface 210a, 210b can be based on one or more performance metrics, such as utilization factors, mapped LTE-B serving areas, proximity between devices 202, 210 to synthesize a network configuration according to the criteria, such as having an optimal, or best possible BMSC node. Such a synthesized solution can facilitate an MBMS session and MBMS bearer to support delivery of the group communication service content to mobile devices 108 (FIG. 1) efficiently in a given targeted coverage area to provide a superior high-speed mobile broadcast experience.

In support of the node selection process, the network architecture 200 can include or otherwise access other network elements. A first network element includes an Operation Support System (OSS) 220. Generally speaking, the OSS 220 is s a set of equipment, programs, tools and/or utilities that help a communications service provider monitor, control, analyze and manage a communications network. To this end, the OSS 220 can be in communication with one or more of the network devices, e.g., including the MMEs 208 and/or the BMSC/MBMS-GW 206. The OSS 220 can monitor or otherwise determine configurations and/or performance metrics associated with the devices 208, 206, their individual performance and/or performance of systems and subsystems determined from combinations of one or more devices of the network 100, 200.

Examples of monitored features can include, without limitation, identity of active/passive network elements, geographic locations, network configuration(s), network element configurations, equipment vendors, network operators, utility, availability, congestion, capacity and/or reliability of individual network elements and/or of portions of the network, or of the network as a whole. Such features, values and/or results can be stored, e.g., in a first data store 222 accessible by the OSS 220.

In some embodiments, the OSS 220 access such features in real time, e.g., directly from the network devices. Alternatively or in addition, the OSS 220 can access historical records of such features to obtain predictions of one or more of the monitored network features. Such predictive features can account for daily variations, e.g., in network traffic, usage of particular devices as it may relate to reliability, e.g., mean-time-between failures based on hours of operation and/or failure records, and the like.

In some embodiments, the network architecture includes a Group Communication Service (GCS) management engine 224. The GCS management engine 224 can be in communication with the OSS 220 and/or storage 222, and with one or more of the network elements, such as the BMSCs and/or the MBMS-GWs. In some embodiments, the GCS management engine 224 is in further communication with one or more of the GCS-AS 202. Such network connectivity can be facilitated by the DSR 204 and/or by other means, such as a separate or sideband channel.

Although the GCS management engine 224 is illustrated as a separate device, it is envisioned that at least a portion of the related functionality can be included or otherwise embedded in one or more of the devices. For example, in some embodiments, the GCS management engine 224 is incorporated into the BMSC and/or the MBMS-GW 206. Alternatively or in addition, the GCS management engine 224 can be incorporated into the GCS-AS 202.

The GCS management engine 224 can be operable to perform any of the various node selection techniques and processes disclosed herein. For example, the GCS management engine 224 can receive a request from a GCS-AS 202 to initiate a group communication to a particular geographic region and/or target UEs 108 (FIG. 1). The GCS management engine 224 can identify available options of equipment and network connectivity, obtain feature and/or metrics associated with the identified equipment, perform tradeoffs between different available combinations, and compare tradeoff results to identify a synthesized solution or selection, e.g., as a most efficient, reliable and/or cost-effective. The relative terms, such as most efficient, reliable or cost effective can be made in reference to a set of possible or candidate solutions that may include a subset of all possible solutions or network configurations, and in at least some instances, including all possible solutions or network configurations.

It is envisioned that other rules can be implemented in the decision process. For example, a particular group communication service provider may identify a preference based on vendor equipment, data centers, geographic locations and the like. Such rules can be programmed or otherwise implemented in the GCS management engine 224, e.g., during a configuration of the network 200. It is also understood that such rules can be reprogrammed at various times and/or based upon occurrences of certain events.

In an LTE-B reference network architecture, the GCS-AS 202 interfaces with the BMSC 206 to establish control plane connectivity prior to initiating a group communication application. Upon successful set up, the GCS-AS 202 can request for allocation of MBMS bearers to initiate the GCS to a targeted region and/or group of user equipment. These bearers can be identified by unique flow identifiers or TMGIs (Temporary Mobile Group Identities) and assigned a certain QoS.

Referring to the example broadcast core network 200 illustrated in FIG. 2, there could be multiple regional pools of MMEs 208, DSRs 204, MBMS-GWs and BMSCs 206 serving various RAN markets with common and/or different vendor combinations. Network configurations can include dedicated GCS-AS nodes 202 deployed in a geo-redundant load-shared pooled configuration to support such critical GCS. The GCS-AS 202 and BMSC 206 can be arranged in a peered connectivity model or there could be a shared configuration, e.g., including a full mesh connectivity between groups of GCS-AS 202 and BMSCs 206 via centralized DSR 210 for a flexible architecture design, as illustrated.

To support such a design, the MB2-C interface 210 implementation on the BMSC 206 and GCS-AS 202 can be pre-programmed or otherwise modified to include intelligence in one or more of the BMSC selection and routing of traffic from GCS-AS 202 towards selected BMSC 206 during normal, overload, nodal error and failover conditions. References to intelligence can include predetermined logic and/or rules. In some instances, such intelligence can include a learning feature, e.g., in which previously determined GCS solutions and/or selections are used to determine a current or future solution. It is understood that in at least some instances intelligence can include elements of artificial intelligence. In some embodiments, the "Y" BMSC nodes 206 can act as the gate keepers from the N GCS-Ass 202 for specific group communication from various regional/public safety communication service providers into the operator's LTE broadcast network. It is worth noting that the numbers X, Y, Z and N referred to herein can include any number extending from 1 to some number greater than one. Additionally, it is understood that at least some of the numbers X, Y, Z and N can be equal to or different from the others.

In such a fully meshed connectivity model, all BMSCs 206 can potentially obtain the TMGI allocation and de-allocation requests from a given GCS-AS 202 or multiple such GCS-AS 202 based on the specific service at any given time. However, the operator could enforce a policy to utilize 1 of the "N" BMSCs 206 as a primary application ingestion source for the GCS provider based on pre-defined selection criteria and to optimize the resource allocation mechanisms.

This disclosure provides a mechanism for selection of the BMSC 206 in association with a GCS-AS 202 to initiate the resource allocation and MBMS bearer activation process. The GCS management engine 224, sometimes referred to as a unified BMSC resources management engine, utilizes a combination of real-time BMSC resource utilization metrics, serving area mapping, peak loading and latency factors to determine the best possible BMSC that can be used by a GCS AS for a specific GCS.

In a simplistic network design, one BMSC 206a and one GCS-AS 202a located in the same or separate data centers can be connected in paired mode to establish a one-to-one diameter peer relationship and exchange MBMS bearer related procedures via the MB2-C diameter interface 210. Such a paired mode of operation may be suitable for a limited scale network deployment to deliver GCS from a given provider set. In such architectures, the BMSC 206a and GCS-AS nodes 206a may be limited by their platform specific, connectivity, redundancy, scalability and capacity performance constraints. Such a solution may not scale easily if more LTE users or machine-to-machine (M2M) devices become interested or need to be delivered with such group services, e.g., in relation to an Internet of things application.

For a large scale mobility network infrastructure design, such peered operation may not represent the best option due to several constraints such as equipment location, connectivity towards multiple BMSC core network elements in distributed data centers, serving LTE customer base, new LTE broadcast group services offering, anticipated user data capacity for a given GCS, session/bearer capacity, broadcast serving areas, regionalized group content distribution etc.

To deliver a superior end user LTE broadcast based GCS experience and rightfully conserve the spectrum as well as unicast network resources, the core network requires a flexible architectural design option, e.g., consisting of multiple GCS-AS 202 and BMSC 206 nodes. In such a pooled resource environment, the BMSC selection process by the GCS-AS 202 can be implemented by anchoring one of the BMSCs 206, e.g., the "right" BMSC 206, as a session initiation source for sending high-quality communication (audio/video/messaging) content towards a targeted group in a given broadcast serving area. References to the right BMSC 206 can refer to a BMSC 206 selected from a pool of BMSCs according to the techniques disclosed herein.

The "Y" BMSCs 206 can be reached from the "N" GCS-Ass 202 via the "Z" regional DSRs 204 in a fully connected mesh topology. In such a design, the diameter peers are cross-connected via DSRs 204 to establish diameter connections towards each other. The network elements 206, 204, 202 can exchange capabilities between each other to learn of the diameter host names for further application layer message exchanges such as the bearer activation, deactivation, modification and status indication procedures.

If a regional DSR 204 or the link between a DSR 204 and a BMSC 206 or a link between GCS-AS 202 and a DSR 204 fails due to any reasons, the BMSCs 206 and GCS-Ass 202 can still communicate via alternate routing and/or redirection towards another regional DSR 204 based on the MB2-C application identifier, a message type and/or its priority.

Based on GCS provisioning, the operator may select one or a subset of the "N" BMSCs 206 for a given GCS broadcast session. Each of the BMSCs 206 in the mesh connectivity model can extract its utilization factors retrieved from the OSS analytics engine 220 on a periodic polling basis and stored in a mapping table on the storage device 222. The BMSCs 206 report their utilization metrics to the OSS 220 based on an operator-predefined configuration interval.

In some embodiments, the same mapping table can store the round trip time latency measurements, e.g., obtained from the BMSCs 206 towards each of the MBMS-GWs 126 (FIG. 1)/GCS-ASs 202 over their respective SCTP transport layer protocol, as well as map the serving area identities (SAI) and MMEs serving those SAIs. Such a mapping table and look up algorithm in the BMSCs 206 updated in near real time can be used to select a "best possible" pair of BMSC-GCS-AS and BMSC-MBMS-GW 206 for a particular GCS session setup and user data transfer.

The LTE-broadcast GCS architecture can be utilized for a variety of regional or nation-wide emergency as well as public safety related critical group communications delivery across a desired broadcast serving area to relieve the unicast network resources. The GCS-AS 202 can leverage the network level intelligence provided by the BMSC 206 pool management and user analytics to be able to decide if a GCS session/bearer activation needs to be setup in a unicast or broadcast mode.

In case of any issues with a given BMSC 206 or set of BMSCs 206 or if the round-trip time from these BMSCs 206 towards the GCS-AS 202 exceeds an operator provisioned critical threshold, the BMSC pool management system can be implemented with a capability to blacklist those BMSCs 206 for a certain duration and once they come out of such critical condition, those BMSCs 206 can be removed from the blacklist and made available for GCS services.

Such an intelligent BMSC selection within the pool environment can help in preventing potential LTE-broadcast GCS related mission critical service outages in the mobility network. The GCS-AS 202 can choose alternate BMSCs 206 based on the mapping table 222, provisioning rules and ensure seamless GCS continuity in case of data center disaster situations.

The BMSC 206 and MBMS-GW 126 (FIG. 1) network elements can be integrated in a direct-peered mode connectivity model for simplicity of network design and operation. They can also be connected via the centralized DSR 204 regional pool in an alternate mesh connectivity model. Such an architecture is preferred for a fully flexible LTE-B core network design as it eases the technical requirements on standalone BMSC and MBMS GW nodal design for capacity, scalability and reliability.

The "Y" BMSCs 206 can be connected to the "N" GCS-AS nodes 202 in a fully mesh topology although the right BMSC 206 can still be selected by the primary GCS-AS 202 to be able to optimally deliver the high quality GCS content to the end users. Once a primary BMSC node 206 has been designated and selected for a given GCS service, that BMSC 206 can then initiate the MBMS-GW selection and MBMS session setup procedures towards the MBMS-GW. The MBMS-GW interfaces to the MME and eNB for control and user plane interactions to complete the session setup for enabling GCS service to the end users.

The GCS-AS 202 can extract user intelligence from the OSS system 220 to be able to select between the broadcast and unicast delivery modes in the downlink direction for application signaling and data. In the uplink, the UE 108 (FIG. 1) uses EPS bearer services to exchange application signaling and data. Dynamic join/leave/modify/control can take place when the UE 108 decides to enter/exit/change control for a specific GCS that it may have subscribed to as part of the overall GCS service offerings and as allowed by the network layer.

When users move between areas where there may not be contiguous GCS over broadcast bearers, the UE 108 can inform via underlying unicast or 3G network its desire to change from broadcast GCS mode to unicast mode or disable GCS temporarily until it gets back into the broadcast/unicast LTE coverage area. To maintain service continuity for GCS in transit, UE could potentially receive duplicate signaling and data that could be discarded based on network assisted feedback.

Figure 3:
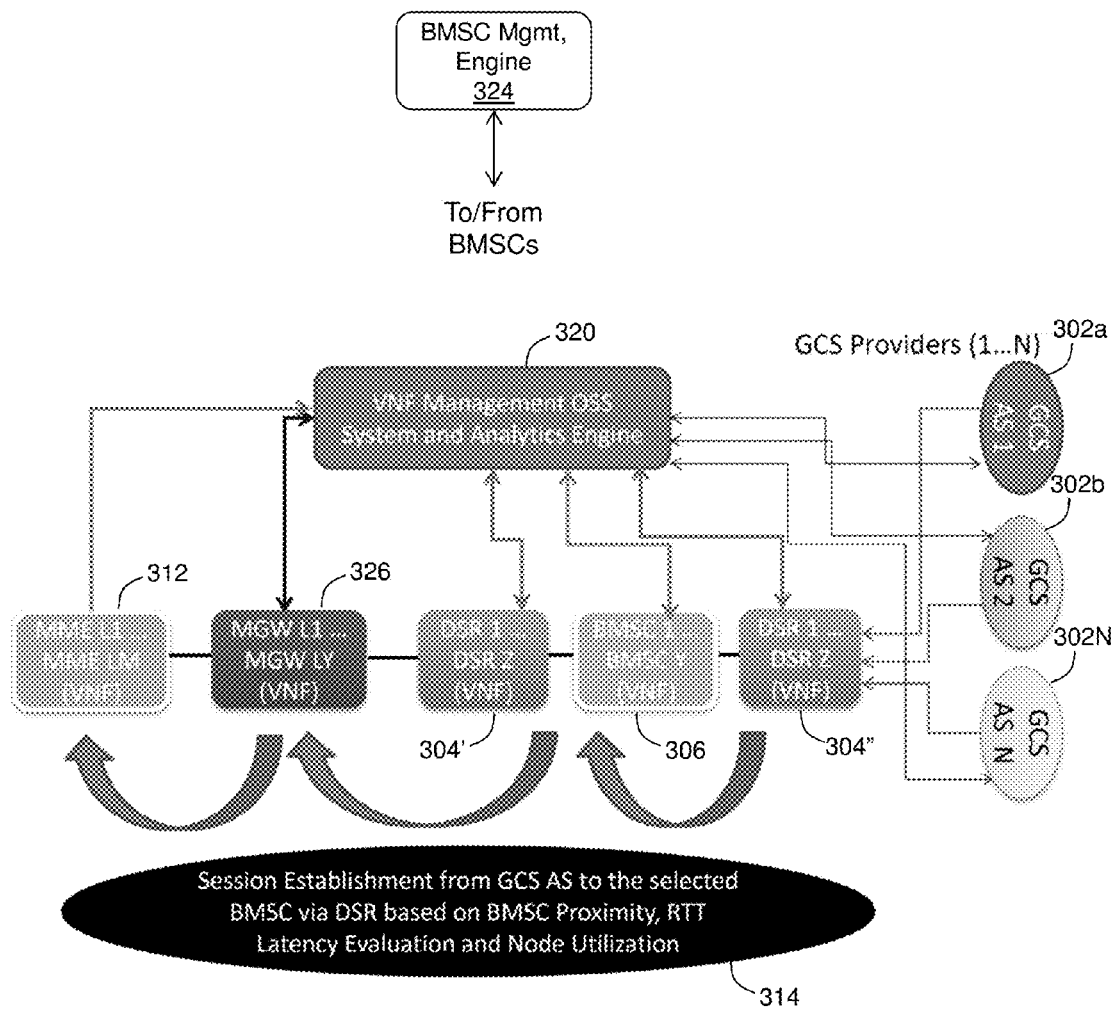
FIG. 3 depicts an illustrative embodiment of a portion of a group communication service networks of FIGS. 1-2.

FIG. 3 depicts an illustrative embodiment of a portion of an MBMS network architecture 300, such as the network architectures of FIG. 1 or FIG. 2 that includes features of software defined networking (SDN), such as one or more virtual machines. Applications of SDN techniques allow a network administrator to manage network services, such as MBMS services, through abstraction of higher level functionality.

By way of example, one or more virtual machines can be configured to implement the nodal functions of an MBMS network, such as the GCS network architectures 100, 200 (FIGS. 1 and 2). Consider a first class of virtual machines implementing a BMSC 306, a second class of virtual machines implementing one or more of the core logic functions, such as an MME 312 and/or an MBMS-GW 326, a third class of virtual machines implementing the DSR 304', 304", and a fourth class of virtual machines implementing the OSS 320. In the illustrative example, the virtual OSS machine 320 also includes virtual network function management.

The different virtual machines can be provisioned, configured and otherwise maintained by the same or different entities. Partitioning of the virtual machines, e.g., as indicated can be beneficial according to any different entities. Alternatively or in addition, a single virtual machine can implement two or more of the different classes of virtual machines. Moreover, the consolidated MBMS network architecture 300 provides the opportunity to reclaim power, floor space, HVAC, and transport connections formerly occupied or otherwise supported by legacy 3G network elements and/or multiple, discrete platforms supporting LTE/4G core network functions. Network virtualization, e.g., in the consolidated MBMS networks 100, 200 allows for the use of virtual machine(s). The virtual machines can include an emulation of a computer system. The emulated computer system can include software, such as operating software, application software, and the like, to emulate any of the network elements and/or nodal functions disclosed herein. The virtual machines can include various configurations that can include dedicated hardware, shared hardware, specialized hardware, networked hardware, and the like.

In operation, to initiate a new MBMS, a requesting GCS-AS 202 sends a GCS-Action Request (GAR) command to one or more of the BMSCs 204. The GAR includes an MBMS-Bearer Request that can include further detail, such as a Temporary Mobile Group Identity (TMGI), an MBMS service area, QoS information, duration, start and/or stop times, and the like. Generally, the TMGI uniquely identifies the MBMS bearer service. The BMSC 206 allocates resources in the MBMS system 100, 200 to support data flow. For GAR commands that do not include a TMGI value, one can be assigned by the BMSC 206. In at least some embodiments, the BMSC 206 can be configured to determine whether a requesting GCS-AS 202 is authorized for the requested MBMS service, responding to a GAR accordingly.

Details related to an MBMS service area can include a list of MBMS Service Area Identities (SAIs). MBMS service areas can be preconfigured, e.g., in the BMSC 206, allowing the BMSC 206 to map the service area(s) to a list of serving cells. The BMSC 206 can interpret other details, such as the QoS, and identify any parameters related to provision of the requested MBMS service to the identified list of serving cells. For example, identified parameters can include one or more of a bit error rate, bandwidth, delay, and the like. The BMSC 206 uses the parameters to establish MBMS bearers to equipment at the identified serving cells, such as eNBs 110 in the MBMS service area. To this end, the GCS-AS 202 uses an identifier, such as the TMGI and Flow ID to identify a particular MBMS delivery session. Once the bearer has been established by control plane signaling information, the GCS-AS 202 uses the TMGI and Flow ID to identify the established MBMS delivery session. Establishment of the MBMS bearer can include identification of an IP address and port number of the BMSC 206 for routing user-plane traffic. MBMS data is directed from the GCS-AS 202 to the BMSC 206 in a user-plane, e.g., containing an IP address and port number of the BMSC, thereby allowing the GCS-AS to send the media to UE within the MBMS service area.

Figure 4:
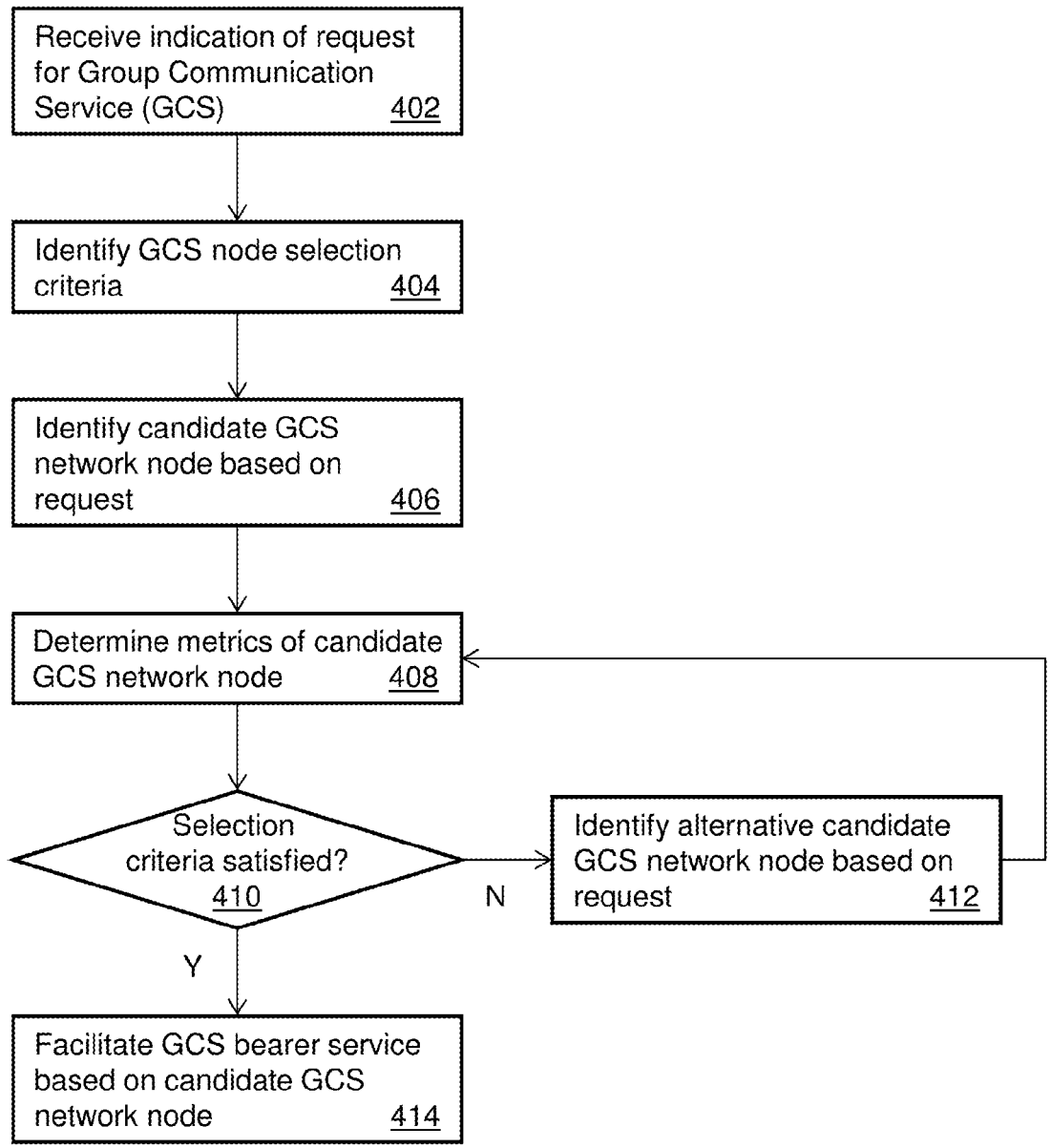
FIG. 4 depicts an illustrative embodiment of a method used in portions of the systems of FIGS. 1-3.

FIG. 4 depicts an illustrative embodiment of a process 400 used in portions of the system described in FIGS. 1-3. In particular, the process 400 includes a nodal selection process between equipment of a group communication service provider and core network elements of a mobile operator network that includes redundant resources that can be provided in a pooled arrangement. An indication of a request for Group Communication Service (GCS) is received at 402. Such requests can be received from one or more of a network or communication service provider, a media content provider, a group and even an individual, who may wish to initiate a broadcast or multicast service. In some embodiments, the request can be received by the GCS-AS 202. Alternatively or in addition, the request can initiate from another source, such as equipment of the service provider, the media content provider, the group or individual. In such instances, the request can be received from such other entities at the GCS-AS 202, which in turn, can result in an internal request for GCS service directed from the GCS-AS 202 towards the network, including a network management or controller.

A GCS node selection criteria is identified at 404. Such criteria can include a goal or preference of any synthesized or resulting network and/or routing configurations. Example preferences include, without limitation, efficiency, e.g., according to network resource utilization, costs, e.g., network operating costs, region and/or location, network operator, equipment vendor, and the like. The GSC node selection criteria can be identified as a default, e.g., established during a configuration of LTE-B service support, and applied to all requests for GCS services. Alternatively or in addition, the node selection criteria can be provided by one of a requesting entity, an associated GCS-AS 202 and/or related GCS application. Such selection criteria can once again, be established during a configuration of equipment and/or applications, or entered on a per request basis.

A candidate GCS network node 202 is identified based on request at 406. Candidate GCS network nodes 202 can be identifies according to a default. For example, default GCS network nodes can be associated or otherwise paired to one or more of the GCS-ASs 202. Such associations or pairings does not necessarily indication that the paired nodes will be used in a resulting GCS bearer service. Other GCS nodes can be identified based on criteria of the GCS request. This might include a geographical GCS service area, nodes of a particular service provider and/or of a particular vendor and/or configuration.

Identification of nodes can include a process for expanding a default, preferred, or preconfigured node to one or more other nodes. Such expansion of candidate nodes can be accomplished according to pre-programmed logic and/or rules. For example, alternative candidate nodes can be selected randomly from pools of such nodes. Alternatively or in addition, node selection can include representative sample nodes from different data centers, different geographic regions, different network providers, different vendors, different configurations, and the like. The number of candidates identified can range from an open ended solution of all possible candidates, to some finite value, e.g., 100, 10, 2 or even 1. If a preferred value has been established, such as 100, but the network configuration cannot support that number of alternatives, the number can be all possible candidate networks, i.e., all possible candidates up to some predetermined number.

Metrics of candidate GCS network node are determined at 408. Metrics, without limitation, can include any category of metrics disclosed herein, such as efficiency, round-trip-transit times, utilization, capacity, congestion, reliability, operating costs, and so forth. In some embodiments, the metrics can be monitored, e.g., in a routine manner by an OSS system. Alternatively or in addition, the metrics can be obtained, updated or otherwise determined in response to a request for GCS service. In some embodiments, the metrics can include one or more of historical records, statistical values related to the records, such as averages, maxima, minima, and so forth.

In at least some embodiments, the metrics can include trends. Trends can be determined by processing current and/or historical metrics. For example, trends can include a rate of change of a particular metric. Consider a utilization metric. The current value may be relatively low, but the utilization may be increasing rapidly, as may result from any of usage, time of day, events and the like. In some embodiments, metrics can include combinations of more than one metric. Consider utilization combined with round-trip-transit and/or operating costs. Combination of such different metrics can be determined according to a preprogrammed algorithm and or business rule. Such algorithms and/or rules can be implemented in one or more of the network nodes disclosed herein, or by a separate device, such as a server of a GCS service provider.

A determination is made as to whether a selection criteria as been satisfied at 410. In obtaining such a determination, the selection criteria can be applied to one or more of the candidate network nodes alone or in combination based on the applicable metrics. To the extent that the selection criteria have not been satisfied, identify alternative candidate GCS network node based on request at 412. In some embodiments, the determination can include identifying a particular network node that satisfies the criteria. This might be the first of one or more network node candidates. For example, if ten candidates are identified, each candidate can be evaluated in a sequential manner until one of the candidates satisfies the selection criteria. Once one has been identified, evaluation can stop, as there is no need for further evaluation of other options.

In other embodiments, however, multiple candidate solutions are evaluated, and one particular solution can be selected from among several otherwise suitable options. For example, one or more metrics of each of a number of candidate network nodes can be evaluated resulting in respective evaluation values. A determination of the selection criterial can include a comparison of the multiple options to identify a preferred option. Such preferences can include, without limitation, the option having the greatest or least value of the particular metric from among the available candidates.

To the extent that the selection criteria has satisfied, facilitate GCS bearer service based on candidate GCS network node at 414. Facilitation of a GCS bearer service can include techniques disclosed in relation to the aforementioned MB2 standardized interface. Once the BCS, e.g., MBMS bearer has been established, GCS datagrams or packets can be directed to the UE 108 through the GCS network 100, 200, 300.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
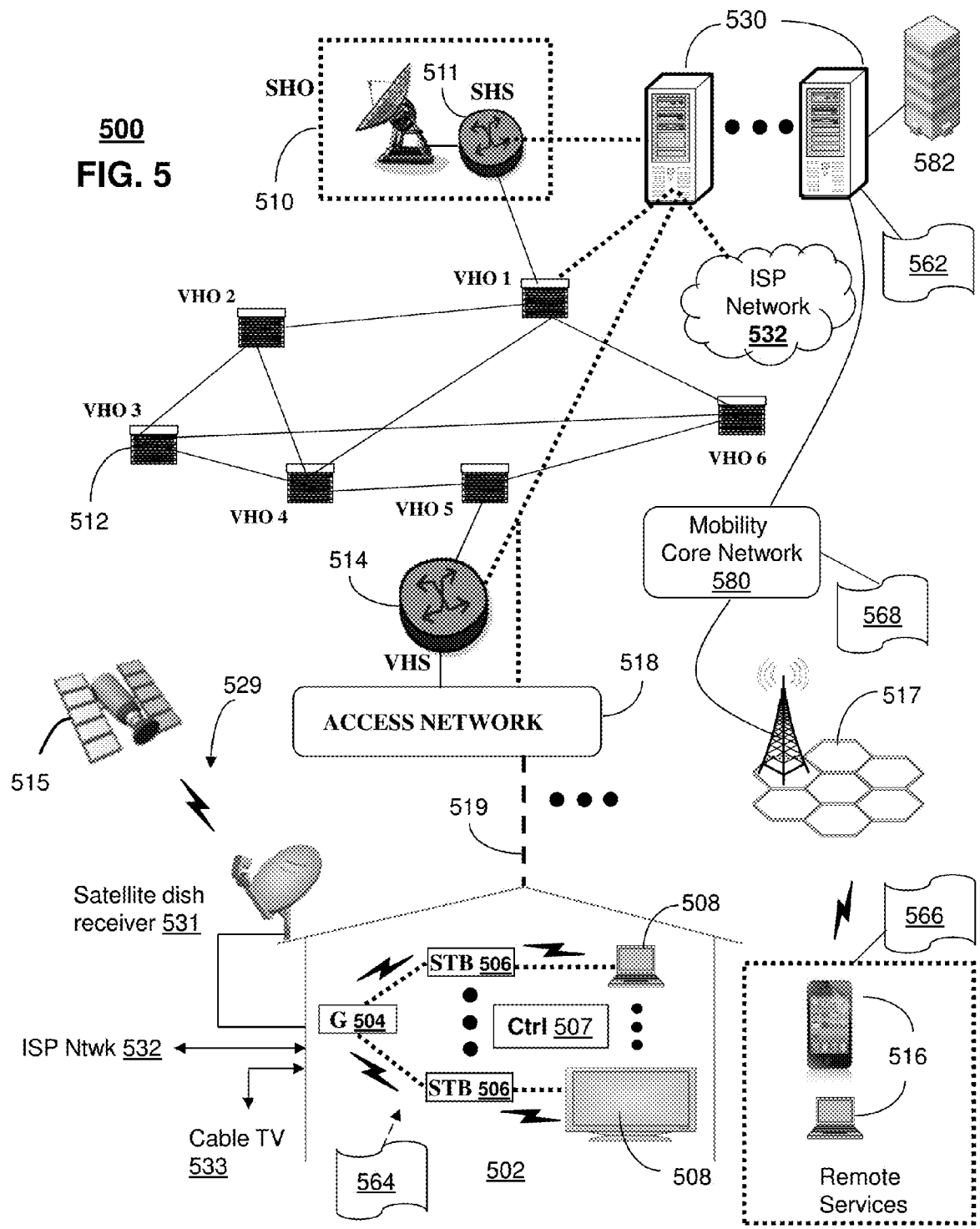
FIG. 5 depicts an illustrative embodiment of a communication system that provides media services, including group communication services according to the systems of FIGS. 1-3 and the process of FIG. 4.

FIG. 5 depicts an illustrative embodiment of a first communication system 500 for delivering media content. The communication system 500 can represent an Internet Protocol Television (IPTV) media system. Communication system 500 can be overlaid or operably coupled with the multicast-broadcast networks 100, 200, 300 of FIGS. 1, 2 and/or 3, as another representative embodiment of communication system 500. For instance, one or more devices illustrated in the communication system 500 of FIG. 5 can obtain characteristics of a number of broadcast processors that process media content for broadcast transmission to equipment of a number of users. The number of broadcast processors includes a number of geographically diverse groups of redundant broadcast processors, such as BMSC and/or MBMS-GWs of a mobility core network 580. The operations further include determining a broadcast efficiency metric based on the characteristics of the number of broadcast processors and selecting one or more broadcast processors based on the efficiency metric. An allocation of mobility network resource is initiated based on the selected broadcast processor(s), and establishment of a broadcast bearer is facilitated using the selected broadcast processor(s), wherein a first media content item is broadcast to the equipment of the plurality of users by way of the broadcast bearer.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, power line or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a GCS-AS 530. The GCS-AS 530 can use computing and communication technology to perform function 562, which can include among other things, the broadcast-multicast techniques described by process 400 of FIG. 4. For instance, function 562 of the GCS-AS 530 can be similar to the functions described in one or more of the OSS systems 220, 320 and/or the broadcast-multicast management engines 224, 324 of FIGS. 2-3 in accordance with process 400. The media processors 506 and wireless communication devices 516 can be provisioned with software functions 564 and 566, respectively, to utilize the broadcast-multicast services of GCS-AS 530. For instance, functions 564 and 566 of media processors 506 and wireless communication devices 516 can be similar to the functions described for the communication devices 108 of FIG. 1 in accordance with process 400.

Multiple forms of media services can be offered to media devices over landline technologies such as those described above. Additionally, media services can be offered to media devices by way of one or more wireless access base stations 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. The base stations 517 can be in communication with the GCS-AS 530 through one or more mobility core networks 580, such as the group communication service network architectures 100, 200, 300 of FIGS. 1, 2 and/or 3. In particular, the mobility core network(s) 580 can be adapted to include functionality 568 to utilize the broadcast-multicast services of the GCS-AS 530 according to the techniques disclosed herein, e.g., including the process 400 of FIG. 4.

Figure 6:
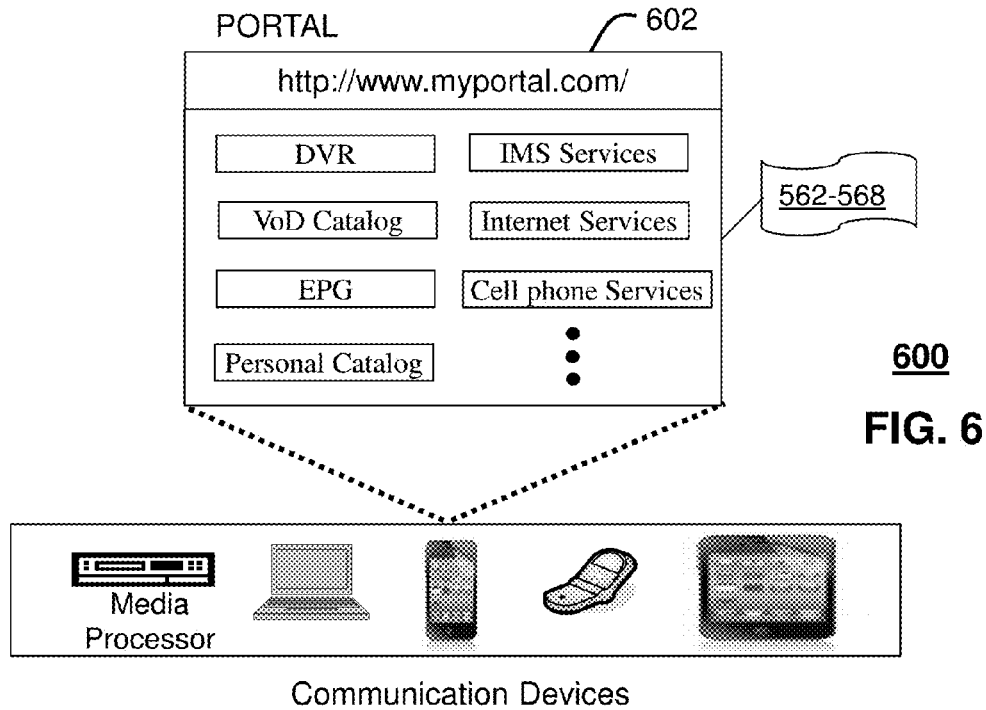
FIG. 6 depicts an illustrative embodiment of a web portal for interacting with the communication systems of FIGS. 1-3 and 5.

FIG. 6 depicts an illustrative embodiment of a web portal 602 of a communication system 600. Communication system 600 can be overlaid or operably coupled with the broadcast-multicast systems 100, 200, 300 of FIGS. 1, 2 and/or 3, communication system 500, and/or communication system 500 as another representative embodiment of the broadcast-multicast systems 100, 200, 300 of FIGS. 1, 2 and/or 3, communication system 500, and/or communication system 500. The web portal 602 can be used for managing services of systems 100, 200, 300 of FIGS. 1, 2 and/or 3 and communication system 500. A web page of the web portal 602 can be accessed by a Uniform Resource Locator (URL) with an Internet browser using an Internet-capable communication device such as those described in FIGS. 1, 2 and/or 3 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 562-568, to adapt these applications as may be desired by subscribers and/or service providers of the systems 100, 200, 300 of FIGS. 1, 2 and/or 3, and communication systems 500. For instance, users of the services provided by GCS-AS 330 or server 530 can log into their on-line accounts and provision the servers 110 or server 530 with group communication services, subscribed and/or operational parameters related to group communication services, such as group communication service areas, lists of subscribers, technical features, including QoS, start and/or stop times, security features, and the like to enable it to communication with devices described in FIGS. 1-5, and so on. Service providers can log onto an administrator account to provision, monitor and/or maintain the systems 100, 200, 300 of FIGS. 1, 2 and/or 3 or server 530.

Figure 7:
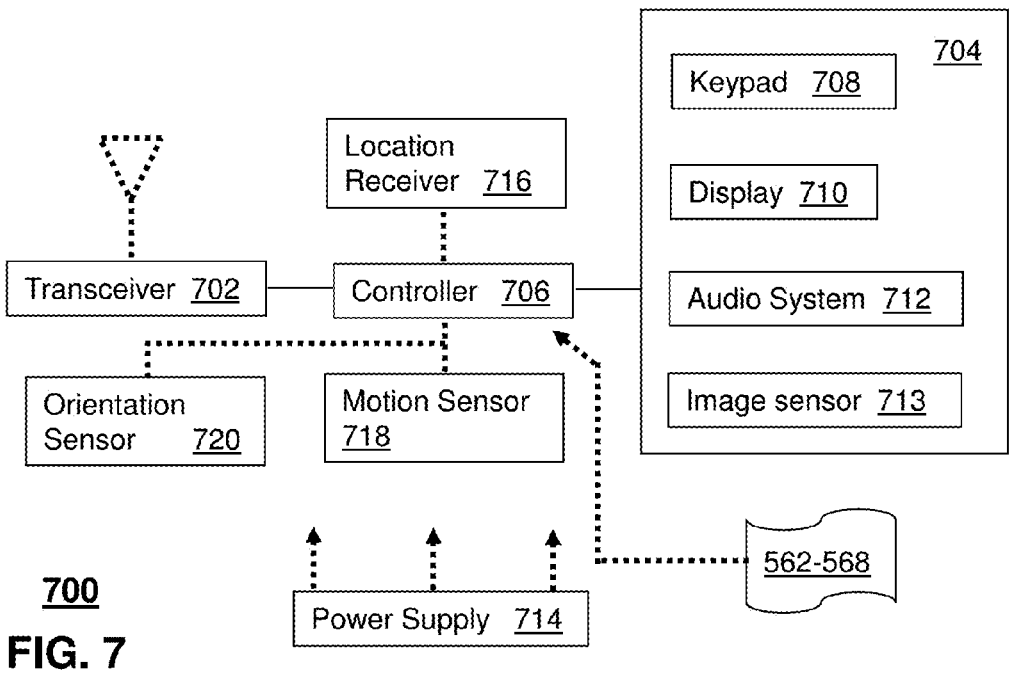
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2 and/or 3, and FIG. 5 and can be configured to perform portions of the process 400 of FIG. 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the UE 108 of FIG. 1, the media processor 506, the media devices 508, or the portable communication devices 516 of FIG. 5, as well as the IMS CDs 501-502 and PSTN CDs 503-505 of FIG. 5. It will be appreciated that the communication device 700 can also represent other devices that can operate in systems 100, 200, 300 of FIGS. 1, 2 and/or 3, communication systems 500 of FIG. 5 such as a gaming console and a media player. In addition, the controller 706 can be adapted in various embodiments to perform one or more of the functions 562-568.

Upon reviewing the aforementioned embodiments, it would be evident to an artisan with ordinary skill in the art that said embodiments can be modified, reduced, or enhanced without departing from the scope of the claims described below. For example, the intelligence in selecting a network node to support GCS services can be provided by an entity other than the network service provider or the content service provider. Consider an entity providing a service to network and/or content service providers to facilitate a coordination of GCS services according to one or more service criteria. The network and/or content providers can subscribe to the service, e.g., obtaining guidance in configuring network elements to deliver GCS services consistent with the particular criteria. In such instances, the intelligence can be included on one of the network nodes, or on another server, e.g., a server resident at a data center and/or otherwise accessible by a PDN 106, such as the Internet or World-Wide-Web. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
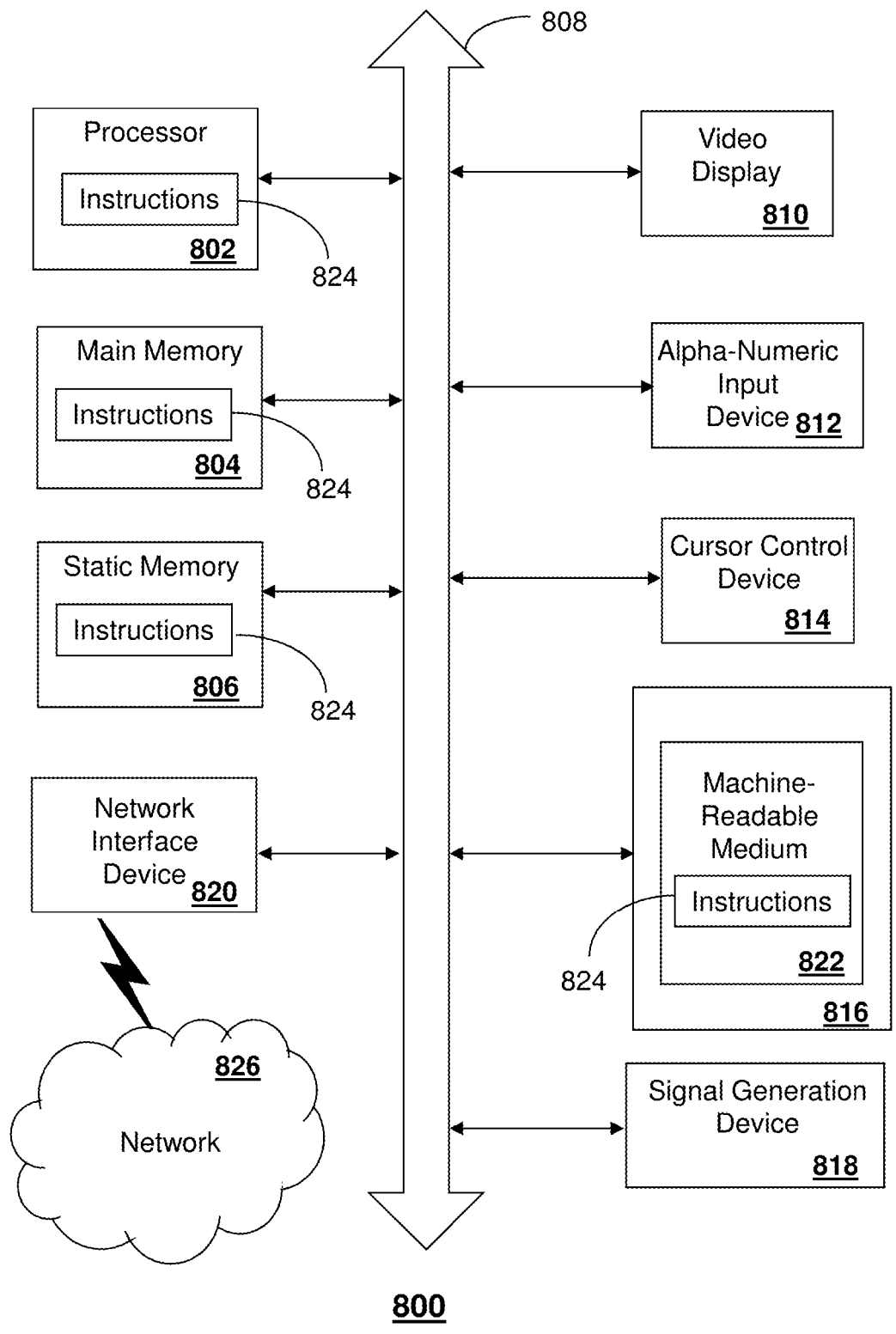
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the GCS management engine 224, 530, the OSS 220, the media processor 506, the BMSC 296, the MBMS-GW 126, the GCS-AS 202 and other devices of FIGS. 1-3 and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE, LTE-Advanced) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a processor; and
   a memory that stores executable instructions that, when executed by the processor, facilitate performance of operations, comprising:
   receiving a request to initiate a multimedia broadcast multicast service (MBMS) to wirelessly distribute media content to mobile user equipment within a target geographical region using a common radio channel;
   obtaining, in response to the request, an efficiency metric for each broadcast multicast service center (BMSC) of a plurality of BMSCs available to process the media content for distribution to the mobile user equipment within the target geographical region;
   evaluating the efficiency metric for each of the plurality of BMSCs to obtain an evaluation result, wherein the efficiency metric is based on measured parameters related to the BMSCs;
   selecting a BMSC of the plurality of BMSCs to obtain a selected BMSC based on the evaluation result; and
   facilitating establishment of an MBMS bearer service using the selected BMSC, wherein a first media content item is disseminated to the mobile user equipment within the target geographical region using the common radio channel by way of the MBMS bearer service.

2. The system of claim 1, wherein the efficiency metric comprises one of resource utilization metrics, associated wireless serving areas, proximity to a group communication service processor providing the first media content item, loading metrics, latency factors, round trip time latency measurements or any combination thereof.

3. The system of claim 2, wherein the plurality of BMSCs are accessible by way of a communication network, the efficiency metrics further comprising characteristics of network connections to the plurality of BMSCs.

4. The system of claim 1, wherein the plurality of BMSCs are accessible by way of a communication network, wherein the operations further comprise:
   detecting a failure of one of the communication network, the selected BMSC, or both; and
   responsive to the detecting of the failure:
   selecting an alternative BMSC of the plurality of BMSCs to obtain a selected alternative BMSC based on the evaluation result; and
   facilitating establishment of an alternative MBMS bearer service using the selected alternative BMSC.

5. The system of claim 1, wherein the selecting of the BMSC comprises selecting a subset of the plurality of BMSCs to obtain a selected subset of BMSCs based on the evaluation result,
   wherein the facilitating of the establishment of the MBMS bearer service comprises facilitating a plurality of MBMS bearer services using the selected subset of BMSCs.

6. The system of claim 1, the plurality of BMSCs are connected to a group communication service application server (GCS-AS) through a signaling controller.

7. The system of claim 6, wherein the signaling controller is based on a diameter protocol, and wherein the plurality of BMSCs comprises a plurality of geographically diverse groups of redundant BMSCs.

8. A method, comprising:
   determining, by a system comprising a processor, that a request has been made to initiate a multimedia broadcast multicast service (MBMS) to wirelessly distribute media content to mobile user equipment within a target geographical region using a common radio channel;
   obtaining, by the system, in response to the determining that the request has been made, an efficiency parameter for each broadcast multicast service center (BMSC) of a plurality of BMSCs available to process the media content for distribution to the mobile user equipment within the target geographical region;
   evaluating, by the system, the efficiency parameter for each of the plurality of BMSCs to obtain an evaluation result, wherein the efficiency parameter is based on measured parameters related to the BMSCs;
   selecting, by the system, a BMSC of the plurality of BMSCs to obtain a selected BMSC based on the evaluation result; and
   facilitating, by the system, establishment of an MBMS bearer service using the selected BMSC, wherein a first media content item is disseminated to the mobile user equipment within the target geographical region using the common radio channel by way of the MBMS bearer service.

9. The method of claim 8, wherein the efficiency parameter comprises one of resource utilization metrics, associated wireless serving areas, proximity to a group communication service processor providing the first media content item, loading metrics, latency factors, round trip time latency measurements or any combination thereof.

10. The method of claim 9, wherein the plurality of BMSCs are accessible by way of a communication network, the efficiency parameter further comprising characteristics of network connections to the plurality of BMSCs, and
    wherein the plurality of BMSCs comprises a plurality of geographically diverse groups of redundant BMSCs.

11. The method of claim 8, wherein the plurality of BMSCs are accessible by way of a communication network, wherein the method further comprises:
    detecting, by the system, a failure of one of the communication network, the selected BMSC, or both; and
    responsive to the detecting of the failure:
    selecting, by the system, an alternative BMSC of the plurality of BMSCs to obtain a selected alternative BMSC based on the evaluation result; and
    facilitating, by the system, establishment of an alternative MBMS bearer service using the selected alternative BMSC.

12. The method of claim 8, wherein the selecting of the BMSC comprises selecting a subset of the plurality of BMSCs to obtain a selected subset of BMSCs based on the evaluation result,
    wherein the facilitating of the establishment of the MBMS bearer service comprises facilitating a plurality of MBMS bearer services using the selected subset of BMSCs.

13. The method of claim 8, the plurality of BMSCs are connected to a group communication service application server (GCS-AS) through a signaling controller.

14. The method of claim 13, wherein the signaling controller is based on a diameter protocol.

15. A non-transitory machine-readable storage medium, comprising executable instructions that, when executed by a processor, facilitate performance of operations, comprising:

receiving a notification of a request to initiate a multimedia broadcast multicast service (MBMS) to wirelessly distribute media content to mobile user equipment within a target geographical region using a common radio channel;

determining, in response to the notification, an operational parameter for each broadcast multicast service center (BMSC) of a plurality of BMSCs available to process the media content for distribution to the mobile user equipment within the target geographical region;

evaluating the operational parameter for each of the plurality of BMSCs to obtain an evaluation result, wherein the operational parameter is based on measured parameters related to the BMSCs;

identifying a BMSC of the plurality of BMSCs to obtain a selected BMSC based on the evaluation result; and facilitating establishment of an MBMS bearer service using the selected BMSC, wherein a first media content item is disseminated to the mobile user equipment within the target geographical region using the common radio channel by way of the MBMS bearer service.

16. The non-transitory machine-readable storage medium of claim 15, wherein the operational parameter comprises one of resource utilization metrics, associated wireless serving areas, proximity to a group communication service processor providing the first media content item, loading metrics, latency factors, round trip time latency measurements or any combination thereof.

17. The non-transitory machine-readable storage medium of claim 16, wherein the plurality of BMSCs comprises a plurality of geographically diverse groups of redundant BMSCs, and wherein the plurality of BMSCs are accessible by way of a communication network, the operational parameter further comprising characteristics of network connections to the plurality of BMSCs.

18. The non-transitory machine-readable storage medium of claim 15, wherein the plurality of BMSCs are accessible by way of a communication network, wherein the operations further comprise:

detecting a failure of one of the communication network, the selected BMSC, or both; and responsive to the detecting of the failure:

selecting an alternative BMSC of the plurality of BMSCs to obtain a selected alternative BMSC based on the evaluation result; and facilitating establishment of an alternative MBMS bearer service using the selected alternative BMSC.

19. The non-transitory machine-readable storage medium of claim 15, wherein the identifying of the BMSC comprises selecting a subset of the plurality of BMSCs to obtain a selected subset of BMSCs based on the evaluation result, wherein the facilitating of the establishment of the MBMS bearer service comprises facilitating a plurality of MBMS bearer services using the selected subset of BMSCs.

20. The non-transitory machine-readable storage medium of claim 15, the plurality of BMSCs are connected to a group communication service application server (GCS-AS) through a diameter signaling controller.

* * * * *